US012045156B2

United States Patent
Sohns

(10) Patent No.: US 12,045,156 B2
(45) Date of Patent: Jul. 23, 2024

(54) METHOD FOR TESTING A PRODUCT

(71) Applicant: Robert Bosch GmbH, Stuttgart (DE)

(72) Inventor: Joachim Sohns, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 128 days.

(21) Appl. No.: 17/656,256

(22) Filed: Mar. 24, 2022

(65) Prior Publication Data

US 2022/0327042 A1 Oct. 13, 2022

(30) Foreign Application Priority Data

Apr. 13, 2021 (DE) ...................... 10 2021 109 126.8

(51) Int. Cl.
| | |
|---|---|
| *G06F 9/445* | (2018.01) |
| *G06F 3/048* | (2013.01) |
| *G06F 9/455* | (2018.01) |
| *G06F 11/00* | (2006.01) |
| *G06F 11/36* | (2006.01) |

(52) U.S. Cl.
CPC ................................ *G06F 11/3664* (2013.01)

(58) Field of Classification Search
CPC ............ G06F 11/3664; G06F 11/3688; G06F 11/3684; G06F 11/368; G06F 3/0482; G06F 3/04883; G06F 3/0485; G06Q 30/0643; G06Q 10/04; G06Q 30/0603; G06T 19/20
See application file for complete search history.

(56) References Cited

U.S. PATENT DOCUMENTS

| | | | |
|---|---|---|---|
| 10,613,710 B2* | 4/2020 | Malkosh | G06F 3/0482 |
| 2006/0174097 A1* | 8/2006 | Brawn | G06F 11/3688 |
| | | | 714/E11.207 |
| 2020/0082034 A1* | 3/2020 | Sholingar | G06F 30/20 |
| 2021/0149793 A1* | 5/2021 | Shao | G06F 11/3688 |
| 2021/0165932 A1* | 6/2021 | Mohan | G06F 11/3476 |
| 2022/0198107 A1* | 6/2022 | Pedersen | G06F 30/27 |

FOREIGN PATENT DOCUMENTS

DE       102020205539 A1       11/2021

OTHER PUBLICATIONS

Chance, Greg, et al. "An agency-directed approach to test generation for simulation-based autonomous vehicle verification." 2020 IEEE International Conference On Artificial Intelligence Testing (AITest). IEEE, 2020. (Year: 2020).*

* cited by examiner

*Primary Examiner* — Thuy Dao
(74) *Attorney, Agent, or Firm* — NORTON ROSE FULBRIGHT US LLP; Gerard A. Messina

(57) ABSTRACT

A computer-implemented method for testing a product, in particular software, hardware, or a system comprising hardware and software, in which, depending on input parameters, a simulation of the product is carried out, with the aid of which a particular property of the product is tested. Depending on a comparison between a result of the simulation and a requirement made of the particular property, a first classification is output for the result of the simulation. Depending on a comparison between reference data from an alternative test of the particular property of the product and the requirement made of the particular property, a second classification is determined. Depending on the first classification and the second classification, an accuracy or robustness of the simulation is determined.

9 Claims, 2 Drawing Sheets

METHOD FOR TESTING A PRODUCT

CROSS REFERENCE

The present application claims the benefit under 35 U.S.C. § 119 of German Patent Application No. DE 10 2021 109 126.8 filed on Apr. 13, 2021, which is expressly incorporated herein by reference in its entirety.

FIELD

The present invention relates to a computer-implemented method for testing a product, and to a computer program configured for this purpose, and to a test environment configured for this purpose.

BACKGROUND INFORMATION

German Patent Application No. DE 10 2020 205 539 describes a method for testing a technical system, in particular an at least partly autonomous robot or vehicle. In this case, a virtual test classifier is implemented, which combines the requirements of model validation and product testing.

SUMMARY

A computer-implemented method is provided for testing a product, in particular software, hardware, or a system comprising hardware and software such as an embedded system. In accordance with an example embodiment of the present invention, in the method, depending on input parameters, a simulation of the product is carried out, with the aid of which a particular property of the product is tested. Depending on a comparison between a result of the simulation and a requirement made of the particular property, a first classification is output for the result of the simulation. Depending on a comparison between reference data from an alternative test of the particular property of the product and the requirement made of the particular property, a second classification is determined. Depending on the first classification and the second classification, an accuracy or robustness of the simulation is determined. In particular, a determination of this kind may comprise outputting a metric for assessing the accuracy or robustness of the simulation, for example in the form of a confusion matrix or an established information measure such as an information gain.

The (technical) product may in particular be software which is to run on a processing unit in a technical system, such as a detection, monitoring or control function in an at least partly autonomous vehicle or robot. The (technical) product may also be hardware comprising software, such as a sensor, an actuator or a control device of an at least partly autonomous robot or vehicle.

In the context of the methods provided, the classifications are in particular not used for classifying product properties or for detecting faults in products with the aid of classification.

Rather, classification establishes whether and to what degree the assessment of a product carried out on the basis of a simulation corresponds to the properties of the product in reality. It provides the possibility of determining the quality of a simulation in relation to specified criteria. Moreover, it provides the possibility of initiating automated simulations. A further possible application lies in predicting the quality of simulation results without the need to carry out additional reference measurements.

In a preferred specific embodiment of the present invention, the reference data are from a test on the real product, or from an (in particular, a particularly accurate) reference simulation.

The first classification and the second classification may for example each comprise whether the product passed or failed the test, or whether the test was not carried out because the necessary conditions were not met. It is also possible for the first classification and the second classification each to comprise whether the diagnostic or detection function gives a false positive, a false negative, a true positive or a true negative result, in particular in the case of simulation of a detection or diagnostic function. Moreover, the first and the second classification may each comprise whether a pre-defined, safety-relevant event occurred or not, in particular in the case of simulation of a safety-critical function. These classifications make possible a stable and meaningful metric for determining the accuracy and robustness of the simulation.

In a particularly preferred variant, depending on first classifications and/or second classifications, a classifier is trained for simulation accuracy. Once trained, this classifier makes it possible to determine the accuracy or robustness of a simulation even in the absence of corresponding reference data. It is then possible, in particular alongside the trained classifier, that only the relevant signals or outputs from the simulation are required for the assessment.

Among other things, the method in accordance with an example embodiment of the present invention makes possible the following applications and in so doing provides in particular the following advantages:

- Assessment of the accuracy or robustness of a simulation environment for testing a diagnostic function or a detection function (for example driver-assist functions, safety-critical functions, or diagnostic functions in a control device of a vehicle)
- Assessment of a simulation environment in the context of SOTIF simulations
- Assessment of the accuracy or robustness of models used in an HIL, MIL, or SIL environment for testing a diagnostic function or a detection function (for example driver-assist functions, safety-critical functions, or diagnostic functions in a control device of a vehicle)
- Saving on real measurements as a result of classification-supported determination or prediction of the accuracy or robustness of simulation
- Classifying a specified quantity of tests or scenarios, and using these as a basis to assess under which constraints, or for which type of input variables, the simulation gives similar results to reality, and under which constraints, or for which input variables, the simulation models used are too inaccurate
- Comparing different simulation-based test platforms or test environments on the basis of classification-based metrics.

BRIEF DESCRIPTION OF THE DRAWINGS

Specific embodiments of the present invention will be explained in more detail below with reference to the figures.

DETAILED DESCRIPTION OF EXAMPLE EMBODIMENTS

In software technology, the use of models for automating testing activities and for generating test artifacts in the test process is grouped together under the general term of "model-based testing" (MBT). The generation of test cases from models which describe the target behavior of the system that is to be tested, for example, may fall under this.

Embedded systems in particular rely on consistent input signals from sensors and in turn stimulate their environment with the aid of output signals to various actuators. In the course of the verification and upstream development phases of such a system, it is thus possible to simulate its model in the loop (MIL), software in the loop (SIL), processor in the loop (PIL) or overall hardware in the loop (HIL) together with a model of the environment. In automotive technology, simulators in accordance with this principle for the testing of electronic control devices are sometimes designated component, module or integration test benches, depending on the test phase and subject.

Simulations of this kind are widely used in various industrial sectors, and are used for example to test the validity of embedded systems in electrical tools, engine control units for drive, steering and brake systems, camera systems, systems having artificial-intelligence and machine-learning components, robotic systems or autonomous vehicles, in early phases of their development. However, the results of such simulation models have typically only been involved in clearance decisions to a limited extent up until now, because of a lack of confidence in their reliability.

In the context of product development, classification methods may be used among other things for developing diagnostic functions for control devices and in the area of design for reliability. The focus here is on detecting typical fault patterns on the basis of measurement data. In control device functions for driver-assist functions, as well, classification methods and other machine-learning methods are used in various ways.

The text below describes examples of using classifiers or classification methods in the context of the verification or validation of a product, for example for validating an embedded software function, in particular for driving functions of an at least partly automated vehicle or robot.

Figure 1:
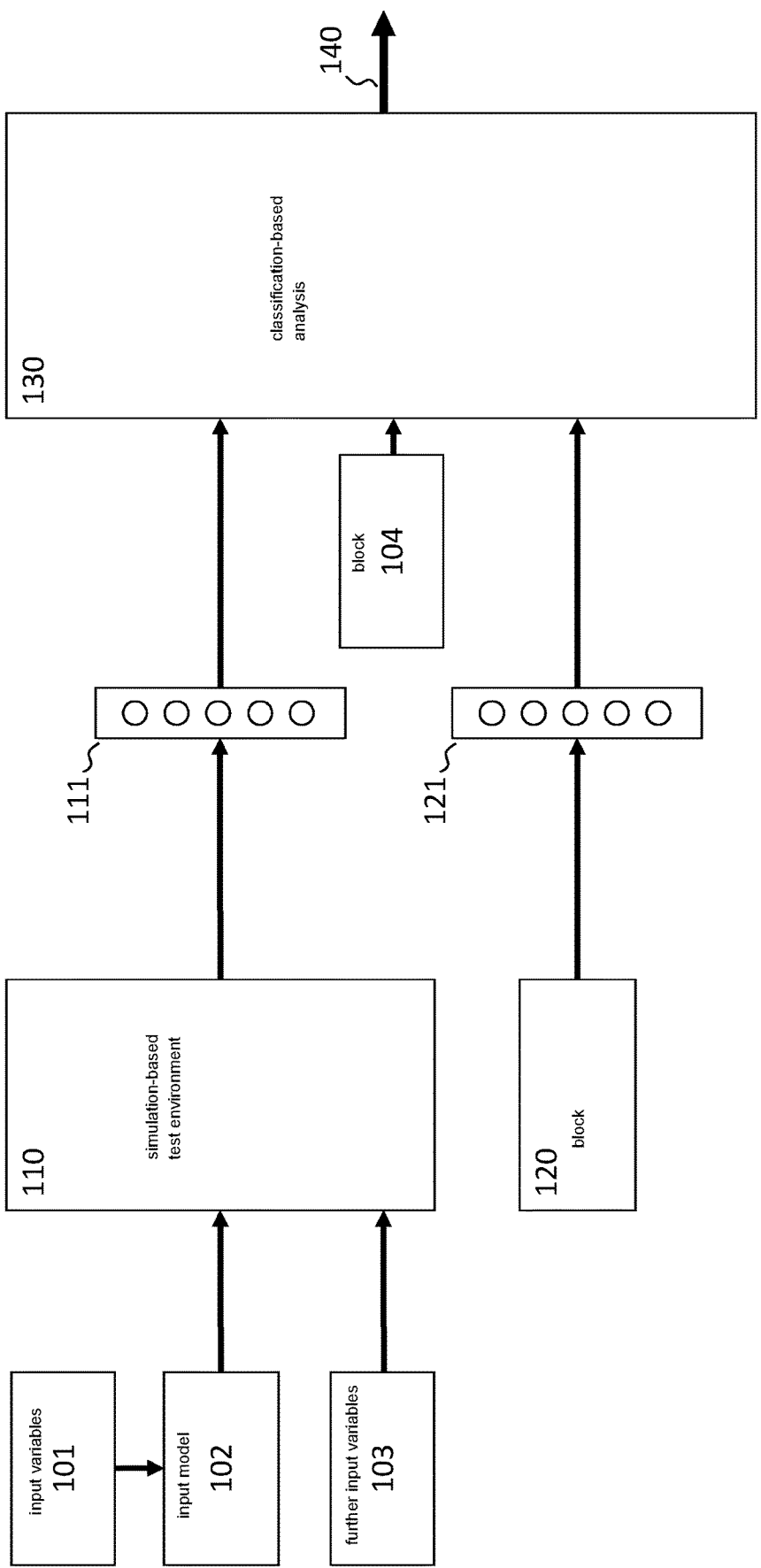
FIG. 1 shows an exemplary configuration of a computer-implemented method for testing a product, in accordance with an example embodiment of the present invention.

FIG. 1 shows an exemplary configuration of a computer-implemented method for testing a product. Different simulation models and different classifiers may be involved in the validation using the framework described for this purpose.

Input variables 101 may be input to an input model 102 that outputs output variables to a simulation-based test environment 110. Moreover, further input variables 103, such as scenario lists, data from a test catalog or similar information, may be sent directly to simulation-based test environment 110.

The simulation-based test environment may access various models and tools, and, with the aid of a simulation, may investigate the product that is to be tested. The test environment may use in particular MIL, SIL, HIL or PIL methods.

Results of the test or tests are transmitted from simulation-based test environment 110 to a classification instance 111, which carries out a classification of them. A result of the classification is transmitted from classification instance 111 to block 130.

Further information, such as relevant signals of the simulation, reference data, model parameters or further input variables, may be transmitted from block 104 to block 130.

Reference data from an alternative test are transmitted from block 120 to a classification instance 121. In this context, the alternative test may be in particular a trial carried out on the real product, or it may be a particularly accurate simulation, more complex than the simulation in block 110. In this case, block 120 may be in particular a database of reference data. As an alternative, block 120 may also be a further test environment, for example also apparatus for generating further measurements, in particular on the real product.

The output variables or results of the simulation from block 110 and the output variables or reference data from block 120 are classified in accordance with specified criteria in classification instances 111 and 121 respectively. These criteria may be determined for example from a user input over an interface.

Possible classification criteria may be, for example:
In software, hardware or system tests: Test passed/test failed, or test cleared/test not cleared
In diagnostic and detection functions: False positive/false negative/true positive/true negative
In the context of simulations relating to functional safety, such as SOTIF (safety of the intended functionality) simulations: Pre-defined event occurred/did not occur.

Depending on the application, further classification criteria may be defined. In this case, classification signifies in particular allocation of the simulation results or reference data to one or more classes of a discrete number of classes.

Block 130 comprises a classification-based evaluation of the accuracy or robustness of the simulation from block 110, and the output variables 140 comprise a measure of the accuracy or robustness of the simulation from block 110. For example, the output variables 140 may comprise a robustness or accuracy metric, such as a measure of information gain, or characteristic variables such as those known from machine learning, such as a confusion matrix.

Moreover, in block 130 it is possible to train a classifier that makes it possible to assess the accuracy or robustness of the simulation for further tests or scenarios without the need to carry out corresponding new reference measurements.

Figure 2:
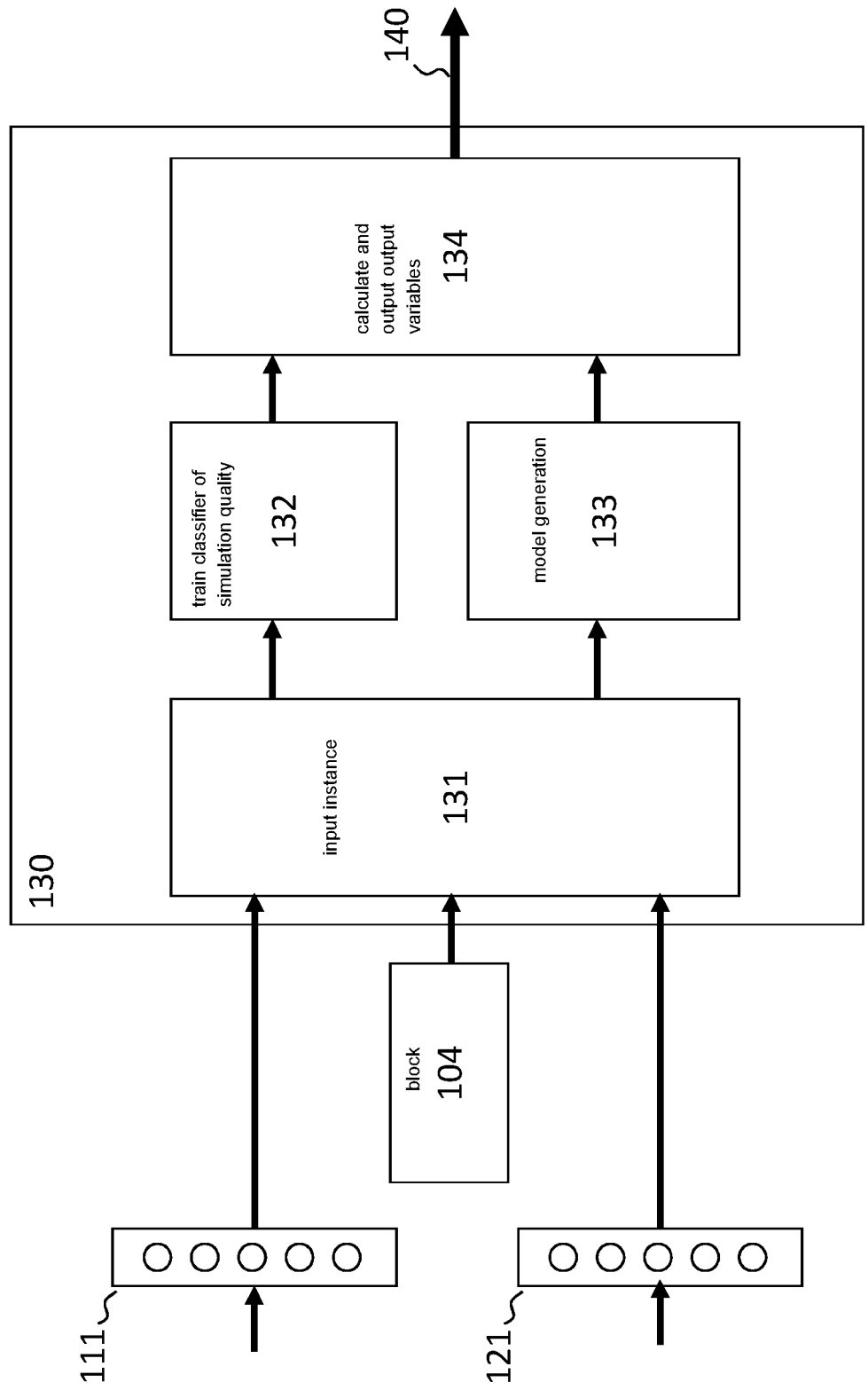
FIG. 2 shows a detail from FIG. 1, with the details of block 130, in accordance with an example embodiment of the present invention.

FIG. 2 shows a detail from FIG. 1, with the details of block 130.

Connected blocks 110 and 120 and their inputs are not shown in FIG. 2. Classification instances 111 and 121 and their inputs and outputs correspond to the descriptions in connection with FIG. 1.

In addition to the classifications from blocks 110 and 120, as described in connection with FIG. 1, block 130 may also receive further input variables from block 104. Block 130 comprises in particular an input instance 131 for receiving and processing input data.

In FIG. 2, block 130 comprises an optional block 132 for training a classifier of simulation quality. For this purpose, this block 132 includes in particular an algorithm for comparing different possible classifiers and for selecting the classifier with the greatest accuracy (feature selection). This classifier serves to optimize the result of classification. Block 132 may obtain information from block 131 for the purpose of training the classifier.

Furthermore, block 130 comprises a block 133 for model generation, in particular for generating a metamodel with the aid of which an accuracy or robustness of the simulation may be determined even in areas for which there are no input data or reference data. In this context, block 133 may obtain input data from block 131 for the purpose of model generation.

Moreover, block 130 comprises a block 134 for calculating and outputting output variables 140, in particular comprising a measure of the accuracy or robustness of the simulation from block 110. Block 134 may obtain input data from blocks 132 and 133 for the purpose of calculation.

For the selection of features in block 132, model generation in block 133 and the calculation of output variables 140 in block 134, block 130 has, in particular, algorithms for machine learning and classification algorithms, or may access a corresponding library comprising these algorithms.

Two different variants for training the classifier are presented below.

In the first variant, a joint classifier, for example in the form of a confusion matrix, is defined in block 130. This joint classifier comprises for example n×n classes, and where appropriate includes a probability for each of these classes. The result of this joint classification, and the respectively associated parameters and input variables, are used for training. The training is carried out for example by established methods of monitored machine learning. As a result of monitored learning, a model is generated which creates a relationship between the parameters and input variables on the one hand, and the known joint classification on the other. The user may optionally select the elements of the n×n matrix for which the trained joint classifier is to present the results with the greatest accuracy. If, for example, the user gives a greater weight to the diagonal elements of the n×n matrix, this means that the classifier has a high degree of accuracy in simulations for which the same classification result was achieved in the simulation and in the reference measurement. In order to achieve this objective, it is possible, for example, for a derived variable, such as a weighted total, to be used for training the joint classifier, rather than the n×n matrix. Another possible variant consists in using multi-objective optimization methods when training the classifier.

Once the classifier has been trained, only the results of the simulation and the parameters and input variables that were used for the training are used in its evaluation for determining the accuracy or robustness of the simulation. There is thus no longer any need for reference measurements in order to determine the classification and the simulation quality for other scenarios or tests.

In the second variant for training the classifier, the output of the classifier is determined for the reference data. The result of this classification, and the respectively associated parameters and input variables, are used for training. Once again, the training may be carried out by established methods of monitored machine learning. As a result of monitored learning, a model is generated which creates a relationship between these parameters and input variables on the one hand, and the known classification on the other.

In order to determine the simulation quality for further tests or scenarios, additional simulations are carried out and evaluated using the methods provided. Instead of generating further reference data (for example by taking measurements), however, the trained classifier is now used for the reference data and is evaluated using other input variables.

The exemplary application of one of the provided methods for function testing an adaptive cruise control (ACC) of a vehicle will be described below. A typical scenario for testing an ACC is a so-called cut-in maneuver. In this case, the system for testing is the ACC functionality of a vehicle under observation. This vehicle is passed by another vehicle, which cuts in—possibly at a small distance—in front of the car under observation, and decelerates. It is a requirement of the ACC for a scenario of this kind that the vehicle under observation must have re-established a defined safety distance after a certain length of time. Different values may be taken for the distance at the time of cutting in, and the speeds of the vehicles. In this scenario, these values play the part of input variables (101 in FIG. 1) for the input model (102 in FIG. 1).

For each possible configuration of parameters, or combination of input variables, a test is carried out in the simulation environment (110 in FIG. 1), and reference data are determined (from block 120 in FIG. 1). For each result of the simulation and the corresponding reference data, a classification is carried out in the classification instances (111 and 121 respectively in FIG. 1), in this case "test passed" or "test failed", depending on whether the vehicle under observation has reached a prescribed safety distance after the prescribed length of time.

For the purpose of determining the accuracy or robustness of the simulation in the simulation environment (110 in FIG. 1), it is now possible to determine a confusion matrix, for example (in block 130 in FIG. 1), as follows.

One entry in the matrix corresponds to the number of tests that were passed in both the simulation and the reference measurement. A further entry is produced from the number of tests that were passed in the simulation and failed in the reference measurement, etc. In this simple case, in particular the quantity of all tests is added up and a mean value formed.

However, the user may optionally have the possibility of selecting, by way of inputs, which parameters are to be used in calculating the total. Moreover, the user may for example select that a confusion matrix is to be formed for each speed value. The parameters selected by the user may thus be allocated to two different categories: Those used to form the mean value, and those for which the confusion matrix is formed separately.

The confusion matrix may also be a function in a multi-dimensional parameter space (in this case for example the speed of the vehicle under observation and the distance at the time of cutting in).

If no parameters are used in calculating the total, the result is, for each point in the multidimensional parameter space, one of the following classes: "test passed in simulation and passed in reference", "test passed in simulation and failed in reference", "test failed in simulation and passed in reference", and "test failed in simulation and failed in reference".

In the application example for test clearance, the classification may be expanded in the following way: "test passed", "test failed", "clearance condition for test not met". The number of entries in the confusion matrix, and the combinatorics of the classes resulting from a comparison of the simulation and the reference measurement, are then increased accordingly.

A confusion matrix for the application case for evaluating a test could for example appear as follows:

| Simulation  | Passed | Failed | Not cleared |
|-------------|--------|--------|-------------|
| Reference   |        |        |             |
| Passed      | 0.1    | 0.2    | 0.1         |
| Failed      | 0.15   | 0.4    | 0           |
| Not cleared | 0      | 0.05   | 0           |

As a further exemplary use, the accuracy or robustness of a simulation from a simulation environment for a diagnostic or detection function is determined.

In systems with embedded software, among other things, diagnostic functions and detection functions are frequently used. Some of these functions serve specifically for the detection and signaling of faults. Examples of this are diagnostic functions for monitoring an exhaust gas post-treatment system. If suspicious behavior, indicative of malfunction, occurs in relevant parameter areas, then a status flag is set, for example, and this is further processed. If an event of this kind occurs again, it results in a fault being displayed to the driver, and a corresponding item of information being stored in the relevant fault memory of the engine control unit.

Another example of the use of diagnostic or detection functions is provided by safety-relevant functions for driver-assist systems such as AEB or ESP. In this case too, the plausibility of signals is checked on the basis of specified criteria, and if certain events occur suitable counter-measures are initiated (such as safe stopping, initiation of emergency braking, or other interventions in the vehicle actuator system).

In these examples, and for many other applications of diagnostic and detection functions, the output of the relevant control unit function may be allocated to one of the following categories:
  false positive: No event has occurred, but the implemented algorithm has signaled an event;
  false negative: No event has occurred, and the implemented algorithm has signaled an event;
  true positive: An event has occurred, and the implemented algorithm has signaled an event;
  true negative: No event has occurred, and the implemented algorithm has not signaled an event.

In order to save on costs, or in order to carry out tests already in an early phase of development, such functions are also increasingly tested on simulation-based platforms and test environments, for example using SIL, MIL or HIL methods.

As a result of determining the accuracy or robustness of a simulation of this kind in a test environment for a diagnostic or detection function, it is possible to calculate a metric, such as a confusion matrix, from a comparison between classifications for the simulation results and those for the corresponding reference data. In this case too, the user may optionally select which parameters are to be used in calculating the total and which are not. If no parameters are used in forming the mean value, each point in the parameter space may be allocated to one of the n classes (for example, 16 classes in a 4×4 matrix for the above-mentioned classifications), depending on what was observed in the simulation and the reference measurement. If a mean value is formed from individual parameters, then a trained classification model may indicate a probability for each point and each category (confusion matrix for each point, as in the case above).

A confusion matrix for the application case for evaluating the performance of a diagnostic or detection function could for example appear as follows:

| Simulation | False pos. | False neg. | True pos. | True neg. |
|---|---|---|---|---|
| Reference | | | | |
| False positive | 0.1 | 0.2 | 0.05 | 0.05 |
| False negative | 0.15 | 0.3 | 0 | 0 |
| True positive | 0 | 0.05 | 0 | 0 |
| True negative | 0.05 | 0.05 | 0 | 0 |

As a further exemplary use, simulations for ensuring the functional safety of a product are considered, for example SOTIF simulations of driving functions of an at least partly automated vehicle.

For example, for this purpose, as a simulation, the scenario of a highway exit may be observed. With the aid of fault models, it is possible to simulate an incorrect lane detection, which may result in the vehicle leaving the road. For each case that was observed in reality, an investigation is carried out into whether, as a result of the fault, the vehicle went outside the lane at the exit or not. With the aid of fault models, these scenarios are then adjusted in the simulation, and a check is made as to whether the vehicle went outside the lane or not in the simulation. For each corresponding point in the parameter space of the fault model, there is now produced one of the following classifications: "event occurred in simulation and in reality", "event did not occur in simulation and did not occur in reality", "event occurred in simulation and did not occur in reality", "event did not occur in simulation and occurred in reality". A classification using the parameters of the fault model with the aid of a metamodel in this case makes it possible to predict the accuracy of prediction of the simulation, even in the case of simulations that are not observed in reality. In this case, the confusion matrix and the information-theory variables derived from it provide an indication of the accuracy or robustness of the simulation model for this type of investigation.

What is claimed is:

1. A computer-implemented method for testing a product, the product including software or hardware or a system including hardware and software, the method comprising the following steps:
  in a first simulation categorization, for each of a plurality of tests of one or more simulations of the product:
    carrying out, depending on input parameters, a respective one of the one or more simulations, using a particular property of the product being tested;
    outputting, depending on a comparison between a result of the respective simulation and a requirement made of the particular property, a first classification as a result of the respective simulation;
    determining, depending on a comparison between reference data from an alternative test of the particular property of the product and the requirement made of the particular property, a second classification; and
    determining, based on a result of a comparison between the first classification and the second classification, a respective accuracy of the respective simulation;
  executing, by a processor, machine learning using the accuracies determined in the first simulation categorization to train a simulation classifier; and
  subsequent to the training of the simulation classifier, executing in a second simulation categorization, by the processor, the simulation classifier, by which execution the simulation classifier identifies an accuracy of a further simulation without comparing a classification made by the further simulation classifier to another classification made based on reference data.

2. The method as recited in claim 1, wherein the reference data are from a test on the real product, or from a reference simulation.

3. The method as recited in claim 1, wherein the first classification and the second classification each include whether the product passed or failed the test, or whether the test was not carried out because conditions specified for carrying out the test were not met.

4. The method as recited in claim 1, wherein the particular property includes a diagnostic or detection function, and the first classification and the second classification each include whether the diagnostic or detection function gives a false positive, or a false negative, or a true positive, or a true negative result.

5. The method as recited in claim 1, wherein the particular property comprises a safety-critical property of the product, and the first classification and the second classification each comprise whether a pre-defined, safety-relevant event occurred or not.

6. The method as recited in claim 1, wherein the accuracy of the simulation is determined in the first simulation categorization using a confusion matrix or an information gain.

7. The method as recited in claim 1, wherein the product includes a safety-critical software function or a safety-critical system for an at least partly automated vehicle or an at least partly automated robot.

8. A computer-readable storage medium on which is stored a computer program for testing a product, the product including software or hardware or a system including hardware and software, the computer-program, when executed by a computer, causing the computer to perform the following steps:
   in a first simulation categorization, for each of a plurality of tests of one or more simulations of the product:
      carrying out, depending on input parameters, a respective one of the one or more simulations, using a particular property of the product being tested;
      outputting, depending on a comparison between a result of the respective simulation and a requirement made of the particular property, a first classification as a result of the respective simulation;
      determining, depending on a comparison between reference data from an alternative test of the particular property of the product and the requirement made of the particular property, a second classification; and
      determining, based on a result of a comparison between the first classification and the second classification, a respective accuracy of the respective simulation;
   executing, by a processor, machine learning using the accuracies determined in the first simulation categorization to train a simulation classifier; and
   subsequent to the training of the simulation classifier, executing in a second simulation categorization, by the processor, the simulation classifier, by which execution the simulation classifier identifies an accuracy of a further simulation without comparing a classification made by the further simulation classifier to another classification made based on reference data.

9. A test environment configured for testing a product, the product including software or hardware or a system including hardware and software, the test environment configured to:
   in a first simulation categorization, for each of a plurality of tests of one or more simulations of the product:
      carry out, depending on input parameters, a respective one of the one or more simulations, using a particular property of the product being tested;
      output, depending on a comparison between a result of the respective simulation and a requirement made of the particular property, a first classification as a result of the respective simulation;
      determine, depending on a comparison between reference data from an alternative test of the particular property of the product and the requirement made of the particular property, a second classification; and
      determine, based on a result of a comparison between the first classification and the second classification, a respective accuracy of the respective simulation;
   execute, by a processor of the environment, machine learning using the accuracies determined in the first simulation categorization to train a simulation classifier; and
   subsequent to the training of the simulation classifier, execute in a second simulation categorization, by the processor, the simulation classifier, by which execution the simulation classifier identifies an accuracy of a further simulation without comparing a classification made by the further simulation classifier to another classification made based on reference data.

* * * * *